United States Patent [19]

Alfano et al.

[11] Patent Number: 5,463,485
[45] Date of Patent: Oct. 31, 1995

[54] TERAHERTZ REPETITION RATE OPTICAL COMPUTING SYSTEMS, AND COMMUNICATION SYSTEMS AND LOGIC ELEMENTS USING CROSS-PHASE MODULATION BASED OPTICAL PROCESSORS

[76] Inventors: Robert R. Alfano, 3777 Independence Ave., Bronx, N.Y. 10463; Ping-Pei Ho, 240-42 69th Ave., Douglaston, N.Y. 11362; Patrice Baldeck, 270 Convent Ave. #2C, New York, N.Y. 10031

[21] Appl. No.: 259,877

[22] Filed: Jun. 15, 1994

Related U.S. Application Data

[60] Continuation of Ser. No. 806,170, Dec. 12, 1991, Pat. No. 5,373,381, which is a division of Ser. No. 382,752, Jul. 21, 1989, Pat. No. 5,150,248.

[51] Int. Cl.[6] .............................. G02F 3/00; G02F 2/02; G02F 1/39
[52] U.S. Cl. ........................................... 359/107; 359/330
[58] Field of Search ................................. 359/107, 108, 359/326, 327, 330, 331, 332

[56] References Cited

U.S. PATENT DOCUMENTS

| | | |
|---|---|---|
| 3,448,782 | 6/1969 | Fleisher et al. . |
| 3,617,936 | 11/1971 | Bjorkholm . |
| 3,995,311 | 11/1976 | Taylor . |
| 4,128,300 | 12/1978 | Stotts et al. . |
| 4,178,079 | 12/1979 | Bjorklund et al. . |
| 4,382,660 | 5/1983 | Pratt, Jr. et al. . |
| 4,496,222 | 1/1985 | Shah . |
| 4,529,273 | 7/1985 | Cronin-Golomb et al. . |
| 4,703,992 | 11/1987 | Yeh . |
| 4,778,261 | 10/1988 | Boyd et al. . |
| 4,793,670 | 12/1988 | Crossland et al. . |
| 4,964,131 | 10/1990 | Liu et al. . |
| 4,973,154 | 11/1990 | McMichael et al. . |
| 5,015,054 | 5/1991 | Chaffee . |
| 5,111,322 | 5/1992 | Bergano et al. . |
| 5,115,488 | 5/1992 | Islam et al. . |
| 5,150,248 | 9/1992 | Alfano et al. . |

OTHER PUBLICATIONS

Baldeck et al., "Effects of Self–Induced and Cross–Phase Modulations", Revue Phys. Appl., 22:1677–1694 (1987).
Swartzlander, Jr. et al., "Self–Deflection of Laser Beams in a Thin Nonlinear Film", J. Opt. Soc. Am. B., 5(4):765–768 (Apr. 1988).
The Supercontinuum Laser Source, Alfano, ed., Ch. 4, "Cross–Phase Modulation", Baldeck et al., Springer–Verlag, New York, 1989, 117–119.
Alfano et al., "Self–, Cross–, Induced–Phase Modulations of Ultrashort Laser Pulse Propagation", IEEE J. of Quantum Elect., 24(2):351–363 (Feb. 1988).
Dianov et al., "Optical Kerr Effect in Glass Fiber Waveguides", Sov. J. Quantum Electr., 17(4):517–519 (Apr. 1987).
Schadt et al., "Generation of Short Pulses from CW Light", Electronics Letters, 23(20):1090–1091 (Sep. 24, 1987).
Gouveia-Neto et al., "Subpicosecond-Pulse Generation", Optics Letters, 13(10):901–903 (Oct. 1988).
Byron, "Kerr Modulation of Signals at 1.3 and 1.5 µm", Electronics Letters, 23(24):1324–1326 (Nov. 19, 1987).
Butylkin et al., "Parametric Frequency Conversion of Ultrashort Light Pulses", Sov. J. Quantum Electron, 10(3):378–380 (Mar. 1980).

*Primary Examiner*—Martin Lerner
*Attorney, Agent, or Firm*—Kriegsman & Kriegsman

[57] ABSTRACT

Optical communication systems, optical computing systems and optical logic elements which rely on the phenomina of cross-phase modulation to alter and control, either or simultaneously, the spectral, temporal or/and spatial properties of ultrashort light pulses for processing information with high speed repetition rates. A weak beam of ultrashort light pulses is modulated by an intense beam of ultrashort light pulses by copropagating both beams through a non-linear medium such that cross-phase modulation effects are realized.

1 Claim, 10 Drawing Sheets

TERAHERTZ REPETITION RATE OPTICAL COMPUTING SYSTEMS, AND COMMUNICATION SYSTEMS AND LOGIC ELEMENTS USING CROSS-PHASE MODULATION BASED OPTICAL PROCESSORS

This is a continuation of application Ser. No. 07/806,170, filed Dec. 12, 1991, now U.S. Pat. No. 5,373,381 issued Dec. 13, 1994 which is a division of application Ser. No. 07/382,752, filed Jul. 21, 1989, now U.S. Pat. No. 5,150,248.

BACKGROUND OF THE INVENTION

The present invention relates generally to optical systems and more particularly to optical computing, information and communication systems and logic elements for use therein which utilize the principle of cross-phase modulation (XPM).

When an intense ultrashort light pulse propagates through a non-linear material, it temporally distorts the atomic and molecular configuration of the material. This distortion of the non-linear material instantaneously results in a change in the refractive index of the material. This change in the index of refraction is directly proportional to the intensity of the propagating intense light pulse. The change in the refractive index of the non-linear material, in turn, causes a phase change in the propagating intense light pulse. The phase change causes a frequency sweep within the pulse envelope, typically resulting in a blue shift at the tail end of the pulse and a red shift at the front of the pulse. Typically, the effect is a spectral broadening of the pulse resulting in the generation of a supercontinuum. This spectral effect on the propagating intense light pulse is typically referred to as a self-phase modulation effect.

In addition to experiencing self-phase modulation, an intense light pulse propagating through a non-linear material will typically undergo self-focusing, that is, a narrowing of the cross-sectional diameter of the pulse. Self-focusing occurs because, typically, the intensity of a pulse of light is greatest at its center and weakest at its outer edges. Since n is directly proportional to the intensity of the pulse, the center or the pulse causes a greater change in refractive index of the non-linear material than the outer edges of the pulse. Consequently, the center of the pulse travels slower than its outer edges, causing the outer edges to bend in towards the center of the pulse. This effect causes the beam to focus.

In addition to experiencing self-phase modulation and self-focusing, an intense light pulse propagating through a non-linear material may also be used to induce the phase modulation of and/or the focusing of a co-propagating weak light pulse. These phenomena are typically referred to as cross-phase modulation and induced focusing, respectively.

Cross-phase modulation may result in either frequency shifting (i.e., blue shifting or red shifting) or spectral broadening (i.e., supercontinuum generation), the particular effect depending on the relative times at which the weak pulse and the intense pulse propagate through the non-linear material. For example, if the intense pulse has a greater wavelength than the weak pulse, the intense pulse will travel faster through the non-linear material. Therefore, if the intense and weak pulses are sent propagating into the non-linear material at the same time, the weak pulse will be exposed predominately to the change in refractive index caused by the tail end of the intense pulse. (This is referred to commonly as tail walk-off). The result of tail walk-off is a blue shift of the weak pulse. Analagously, if the weak pulse is sent propagating into the non-linear material ahead of the intense pulse, the weak pulse will feel the effects of the refractive index change due to the front end of the intense pulse (front walk-off). The result of front walk-off is a shift or the weak pulse to the red. Finally, if the weak and intense pulses are sent propagating into the non-linear material so that the weak pulse is subjected to the changes in the refractive index caused by both the tail end and the front end of the intense pulse (e.g. symmetric walk-off or no walk-off), the weak pulse broadens spectrally to both the red and the blue.

Spectral changes arising from cross-phase modulation may lead to changes in the temporal profile of the weak pulse when it propagates into a dispersive medium (i.e. an optical fiber) or a dispersive optical component (i.e. a grating or a prism). For example, if cross-phase modulation results in the spectral broadening of the weak pulse, a further propagation of the weak pulse through a grating pair may slow down its re-shifted frequencies (generated by XPM at the pulse front) with respect to its blues shifted frequencies (generated by XPM at the pulse back), and consequently reduces the pulse duration of the weak pulse.

Cross-phase modulation may also be used to change the spatial distribution of copropagating weak pulses. This effect occurs when the intense pulse generates a spatially-dependent non-linear refractive index. For example, a pump pulse with a Gaussian spatial distribution of its intensity generates a higher refractive index on the propagation axis of the weak pulse. As a consequence, the outer edges of the weak pulse bend in towards the center of the pulse, and the weak pulse focuses.

As a term of art, cross-phase modulation is frequently used generically to refer to both cross-phase modulation and induced focusing.

Non-linear materials are very well known in the art. Examples of non linear materials are BK-7 glass, CdSe, liquid $CS_2$, NaCl crystal, doped glasses, semiconductor bulk and quantum structures, microcrystalline semiconductor particles in glasses polydiacetylene organic polymer and optical fibers.

SUMMARY OF THE INVENTION

The present invention is directed to optical computing and communication systems which rely on the phenomena of cross-phase modulation to alter and control, either or simultaneously, the spectral, temporal or/and spatial properties of ultrashort light pulses for processing of information with high speed (up to tens of terahertz regime) repetition rates. The present invention is also directed to a method for altering and controlling, either, or simultaneously, the spectral, temporal or/and spatial properties of ultrashort light pulses using cross phase modulation.

One optical communication system for transmitting information, which is constructed according to the teachings of the present invention and which involves frequency shifting (i.e. altering the spectral properties) comprises means for generating a first beam of laser light and a second beam of laser light, said first beam comprising a series of ultrashort pulses of a first frequency, said second beam comprising a series of ultrashort pulses of a second frequency, said pulses of said first beam being stronger in intensity than said pulses of said second beam, means for modulating said pulses in the first beam according to predetermined information, means for combining said modulated first beam and second beam to form a third beam, a non-linear material disposed along the path of said third beam for receiving said third beam and for producing a fourth beam, said fourth beam including pulses of said first frequency from said modulated first beam, pulses of said second frequency from said second beam, and pulses of a third frequency, said pulses of said third frequency resulting from XPM produced by copropagation of said first and second beams in said non-linear material, filter means disposed along the path of said fourth beam for filtering out pulses of said first frequency, a beamsplitter disposed along the path of said fourth beam on the output side of said filter means for splitting light passed by said filter means into a fifth beam and a sixth beam, filter means disposed along the path of said fifth beam for transmitting only pulses of said second frequency, detector means for detecting pulses passed by said filter means on the fifth beam, filter means disposed along the path of said sixth beam for passing only pulses of said third frequency, and detector means for detecting pulses passed by said filter means in the path of the sixth beam.

Another optical communication system for transmitting information, which is constructed according to the teachings of the present invention and which involves modulating the time duration and amplitude (i.e. the temporal properties) of ultrashort pulses comprises means for generating a first and second beams of laser light, said first beam comprising a series of ultrashort pulses of a first frequency bandwidth, said second beam comprising a series of ultrashort pulses of a second frequency bandwidth, said pulses of said first beam being stronger in intensity than said pulses of said second beam, said pulses of said second beam having a peak intensity p1, means disposed along the path of said first beam for modulating said pulses according to predetermined information, means for combining said first beam and second beam to form a third beam, a non-linear material disposed along the path of said third beam for receiving said third beam and for producing a fourth beam, said fourth beam including pulses of said first frequency bandwidth, pulses of said second frequency bandwidth and pulses of a third frequency bandwidth, said pulses of said third frequency bandwidth also having a peak intensity p1, said pulses of said third frequency bandwidth being a spectrally broadened version of said first frequency bandwidth caused by cross-phase modulation, filter means disposed along the path of said fourth beam for filtering out pulses of said first frequency bandwidth, means disposed along the path of said fourth beam for optically delaying longer light wavelengths relative to shorter light wavelengths and for producing a fifth beam, whereby said pulses of said second frequency bandwidth become temporally expanded and consequently less intense while said pulses of said third frequency bandwidth become temporally compressed and consequently more intense, and detector means disposed along the path of said fifth beam for measuring said pulses, said detector means set at a intensity detection threshhold level equal to p1.

Another optical communications system for transmitting information, which is constructed according to the teachings of the present invention and which involves controlling the spatial properties of ultrashort pulses comprises means for generating a first and second beams of laser light, said first beam comprising a series of ultrashort pulses of a first frequency, said second beam comprising a series of ultrashort pulses of a second frequency, said pulses of said first beam being greater in intensity relative to said pulses of said second beam, means disposed along the path of said first beam for splitting said first beam into third and fourth beams, means disposed along the path of said third beam for masking a portion of said third beam, means disposed along the path of said fourth beam for masking a portion of said fourth beam, the part of the third beam which is masked being different from the part of the fourth beam which is masked, means for modulating said third beam, means for modulating said fourth beam, means for combining said second, third and fourth beams to form a fifth beam, a non-linear material disposed along the path of said fifth beam for receiving said fifth beam and outputting sixth, seventh and eighth beams, each travelling along a different direction, the sixth beam containing pulses from said second beam, the seventh beam resulting from XPM and containing pulses from said second and third beams and the eighth beam resulting from XPM and containing pulses from said second and fourth beams, means disposed along the paths of said seventh beam for detecting only pulses from said third beam and means and means disposed along the paths of said eighth beam for detecting only pulses from said fourth beam.

An optical AND gate which is constructed according to the teachings of the present invention and which utilizes the principle of cross-phase modulation includes a beamsplitter for combining a pair of beams of light, a delay line for delaying one of the pair of beams so that the two beams overlap, a non-linear medium disposed along the path of the combined beam and a filter for filtering out certain frequencies in the beam passed through the non-linear medium.

An optical invertor which is constructed according to the teachings of the present invention and which utilizes the principle of cross phase modulation includes means for generating a light beam, a beamsplitter, a delay line, a non-linear medium and a filter.

In other embodiments of the invention the intense and weak beams have different polarizations rather than different frequencies.

It is an object of the present invention to provide an optical communication system that makes use of the principle of cross-phase modulation.

It is an object of this invention to provide a method for controlling either the spectral, temporal and spatial properties of ultrashort pulses that makes use of the principle of cross phase modulation.

It is another object of the present invention to provide an optical communication system utilizing an optical processor that has the has the capacity to process data streams in the GHZ to terahertz range.

It is another object of the present invention to provide an optical computing system utilizing an optical processor that has the has the capacity to process data streams in the GHZ to terahertz range.

It is yet still another object of the present invention to provide a new and novel optical processor.

It is a further object of this invention to provide a method for controlling the spectral, temporal and spatial properties of ultrashort pulses that makes use of the principle of cross phase modulation.

It is another object of this invention to provide an all optical system in which a plurality of sub-systems using the principle of cross-phase modulation are cascaded together.

It is still another object of this invention to provide mechanisms for a new and novel ultrafast optical information processor.

Various other features, objects and advantages will appear from the description to follow. In the description, reference is made to the accompanying drawings which form a part thereof, and in which are shown by way of illustration, specific embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In the drawings in which like reference numerals or characters represent like parts and wherein.

DETAILED DESCRIPTION OF PREFERRED EMBODIMENTS

Figure 1:
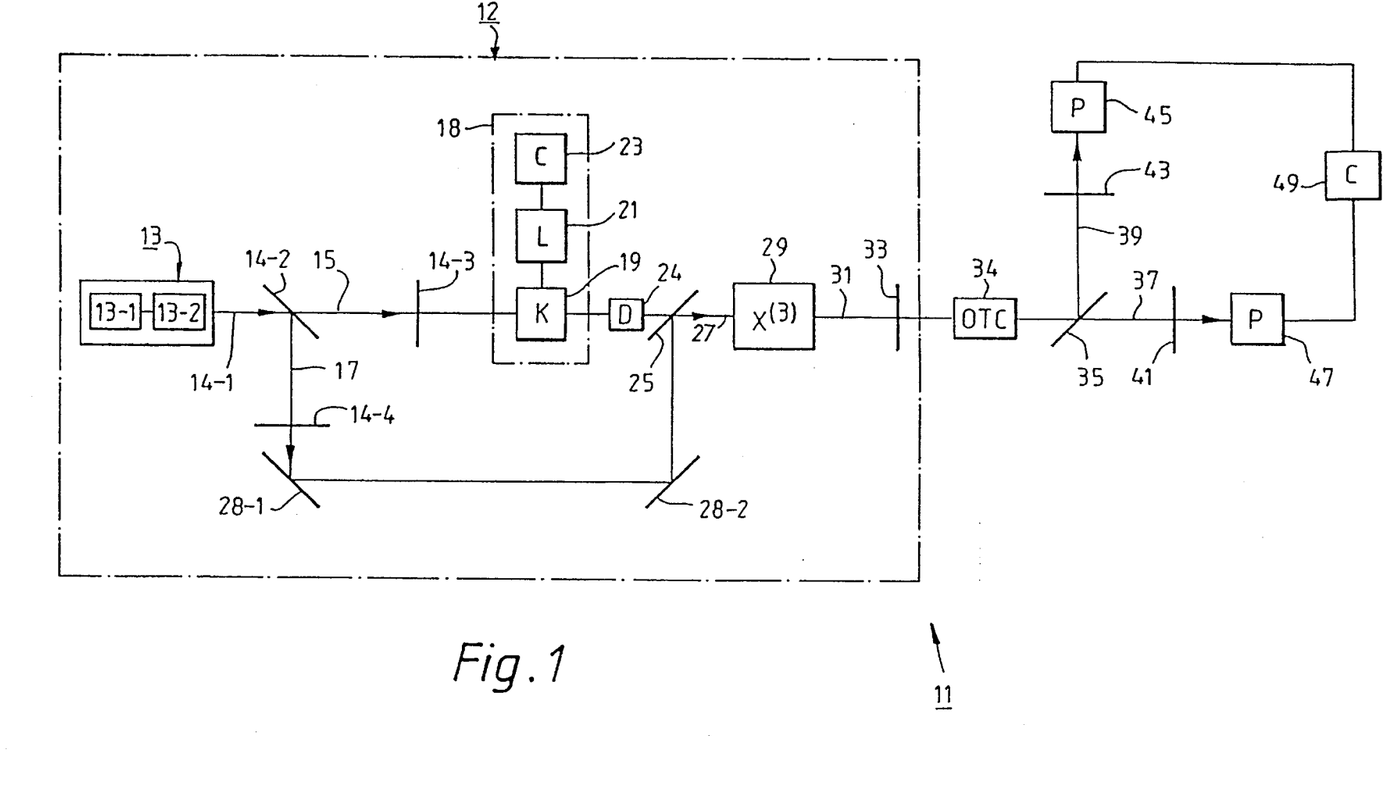
FIG. 1 is a schematic representation of one embodiment of an optical system for transmitting information which is constructed according to the teachings of the present invention.

Referring now to the drawings and more particularly to FIG. 1, there is illustrated a schematic view of one embodiment of an optical system for transmitting information, the optical system being constructed according to the teachings of the present invention and represented generally by reference numeral 11.

Optical system 11, which utilizes the spectral effects of cross phase modulation, includes an optical processor 12.

Processor 12 includes a laser system 13 which is used to produce an output beam 14-1. Beam 14-1 includes intense ultrashort pulses at a first frequency F1 and weaker ultrashort pulses at a second frequency F2. Laser system 13 may comprise a laser 13-1 and a second harmonic generating crystal 13-2. Laser 13-1 may be a mode locked Nd:YAG laser which is capable of emitting a beam of laser light having intense pulses at 1060 nm. Examples of other lasers which may be used are a Ti:sapphire Laser, an Alexandrite laser, a Forsterite laser, a laser diode, a dye laser or a free electron laser.

A dichroic beamsplitter 14-2 splits beam 14-1 into a first or pump beam 15, and a second or probe beam 17. Beamsplitter 14-2 is designed to transmit 90% at frequency F1 and 10% at frequency F2 and reflect 90% at frequency F2 and 10% at frequency F1. A narrow band filter 14-3 removes all frequencies except F1 from pump beam 15 and a narrow band filter 14-4 removes all frequencies except F2 from probe beam 17.

Figure 1A:
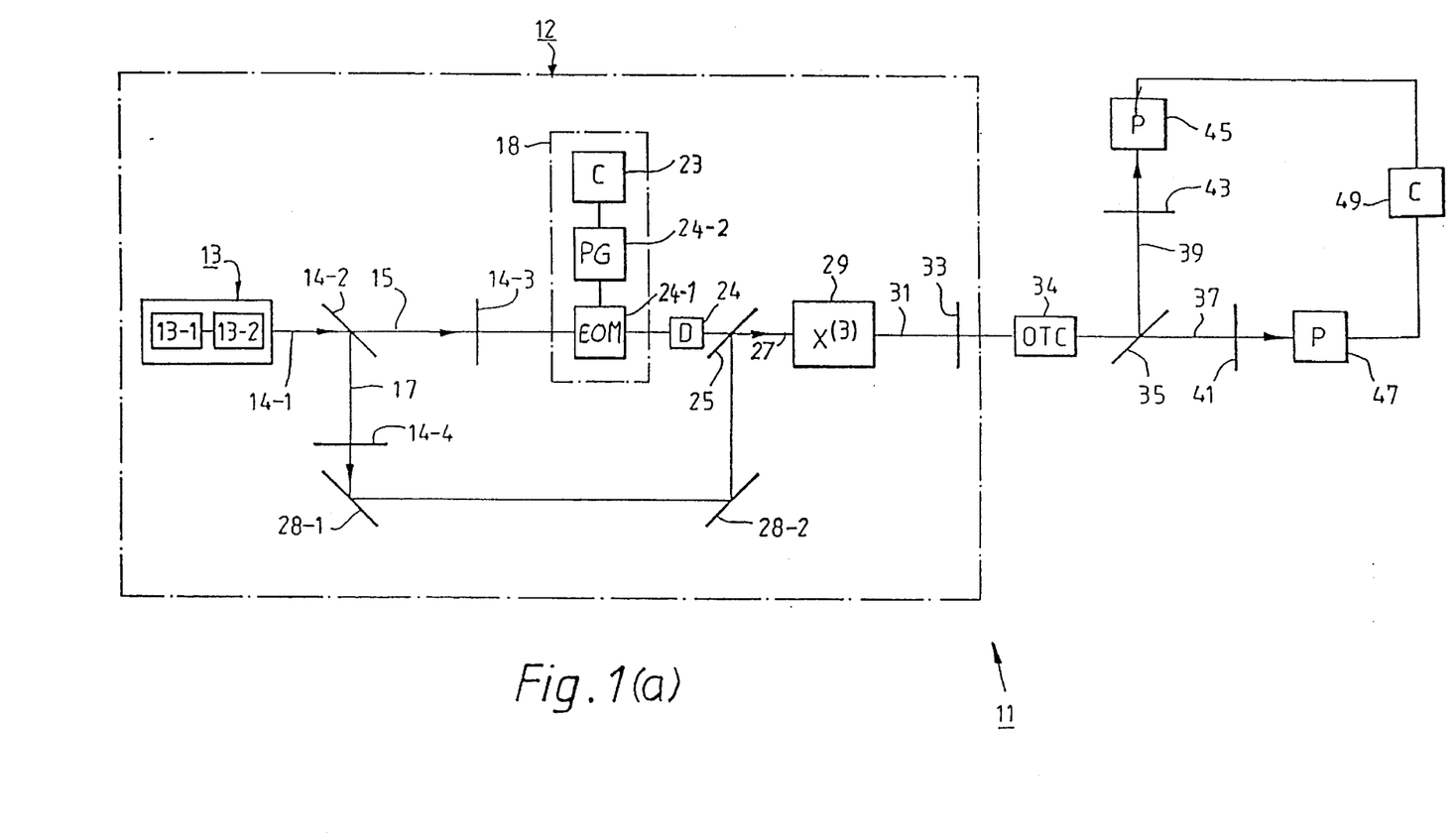
FIG. 1(a) is an illustration of a modification of modulator 18 in FIG. 1.

Processor 12 also includes means 18 disposed along the path of beam 15 for modulating beam 15 in accordance with predetermined information. Means 18 may comprise an optical Kerr shutter 19 which is designed to transmit the intense pulses of first beam 15 only when gating pulses, emitted from a laser 21, simultaneously arrive thereat. Thus, by controlling the emissions of laser 21, such as by a computer 23, it becomes possible through the operation of shutter 19 to effectively encode information obtained from computer 23 into the intense pulses of beam 15. Instead of a Kerrshutter and a laser, an electro-optical modulator 24-1 activated by a pulse generator 24-2 as shown in FIG. 1(a) or a photoconducting switch could be employed.

Processor 12 further includes a beamsplitter 25 for combining beams 15 and 17 and producing a third beam 27 containing both pulses at frequency F2 from beam 17 and pulses at frequency F1 from beam 15. Beam 15 passes into beamsplitter 25 after it is passed through an adjustable optical delay 24 while beam 17 passes directly into beamsplitter 25. Mirrors 28-1 and 28-2 are used to change the direction of beam 17 while adjustable optical delay 24 is used to adjust the path length of beam 15 so that the pulses in beam 15 and the pulses in beam 17 will overlap inside non-linear material $X^{(3)}$, identified by reference numeral 29. The length of material 29 is sufficient to produce "walk-off". Material 29 may be for example glass or an organic substance. If desired, the intensity modulating means 18 can be eliminated and the adjustable optical delay 24 used as a mechanism for temporally modulating the arrival time of the pulses in beam 15. As will hereinafter be explained, non-linear material 29 is used to modulate the frequency of the pulses at frequency F2 in beam 27 using the modulated copropagating pulses at frequency F1. The output from non-linear material 29 is a fourth beam 31 containing pulses at first frequency F1, pulses at second frequency F2 and pulses at a third frequency F3, the pulses at the third frequency F3 being pulses from the second beam 17 that are frequency shifted (an amount f) as a result of propagating through non-linear material 29 with pulses from beam 15.

More specifically, if a pulse in beam 17 copropagates through non-linear material 29 with a pulse from beam 15, the output will be the pulse from beam 15 and a pulse corresponding to a pulse from beam 17 frequency shifted an amount that is proportional to the peak power of the pulse from beam 15. On the other hand, if there is no pulse from beam 15 then the pulse from beam 17 will pass through non-linear material undistorted.

Processor 12 also includes a filter 33, which is diposed along the path of beam 31. Filter 33, is selected to block the transmission of the pulses at frequency F1.

System 11 further includes an optical transmission channel 34. A beamsplitter 35, which is also disposed along the path of beam 31 at the output side of filter 33, is used to split beam 31 into a fifth beam 37 and a sixth beam 39. A pair of filters 41 and 43 are disposed along the paths beams 37 and 39, respectively. Filter 41 is selected to pass only pulses at frequency F2 while filter 43 is selected to pass only pulses at frequency F3. A pair of photodiodes 45 and 47, are used to detect the light passed by filters 41 and 43, respectively. Photodiodes 45 and 47 are both electrically connected to a computer 49 which processes the signals received from each photodiode.

The operation of system 11 as a means for transmitting information is hereinafter described. Laser 13 is activated, causing the emission of an output beam from which is derived a first beam 15 of intense pulses at frequency F1 and a second beam of weak pulses at frequency F2. The information to be transmitted is sent from computer 22 to laser 21 causing the emission therefrom of gating pulses. Those intense pulses of beam 15 that arrive at shutter 19 at the same time that the gating pulses arrive undergo a change in their polarization, permitting their transmission through shutter 19. All other intense pulses are blocked from passing through shutter 19. Consequently, when beams 15 and 17 are combined into beam 27, there will usually be more weak pulses than intense pulses. Those weak pulses that arrive at non-linear material 29 without a corresponding intense pulse emerge from material 29 in beam 31 essentially unchanged. In contrast, those weak pulses that arrive at non-linear material 29 at approximately the same time as the intense pulses undergo cross-phase modulation and emerge from material 29 in beam 31 at a different frequency, the particular shift in frequency depending on whether the arrival of the weak pulses and the intense pulses is synchronized to result in tail walk-off or front walk-off and the extent of the shift depending on the relative intensity of the intense pulses. Beam 31, which contains pulses at frequency F1 at frequency F2 and pulses at frequency F3 is passed through filter 33. Filter 33 removes pulses at frequency F1. Beam 31 is then split into beams 37 and 39. Beam 37 is then passed through filter 41 which filters out the pulses at frequency F2. The modulated pulses are then detected by photodiode 45, and the signal is sent to computer 49. Beam 39 is passed through filter 43 which leaves only the non-modulated pulses to be detected by photodiode 47 and processed by computer 49. As can be appreciated, each signal received by photodiode 47 corresponds to a gating pulse whereas each signal received by photodiode 45 corresponds to the absence of a gating pulses. In this manner, binary information may be transmitted through system 11.

While, for the sake of convenience, source 13 has been represented as a single laser system which simultaneously generates pulses at different frequencies and intensities, it is to be understood that two separate lasers could easily be used if properly synchronized. Also, it is to be understood that while system 11 is designed specifically to process binary information, tertiary information or higher degrees of information could easily be transmitted by increasing the number of differing intense pulses (and the associated number of shutter mechanisms). It is also to be understood that shutter 19 could be replaced by an electro-optic shutter. Also, shutter 19 and laser 21 could be replaced by an electro-mechanical shutter. Furthermore, shutter 19 can be eliminated completely by triggering the emission of intense pulses from laser source 13 with electrical signals from computer 23.

Figures 2, 2A:
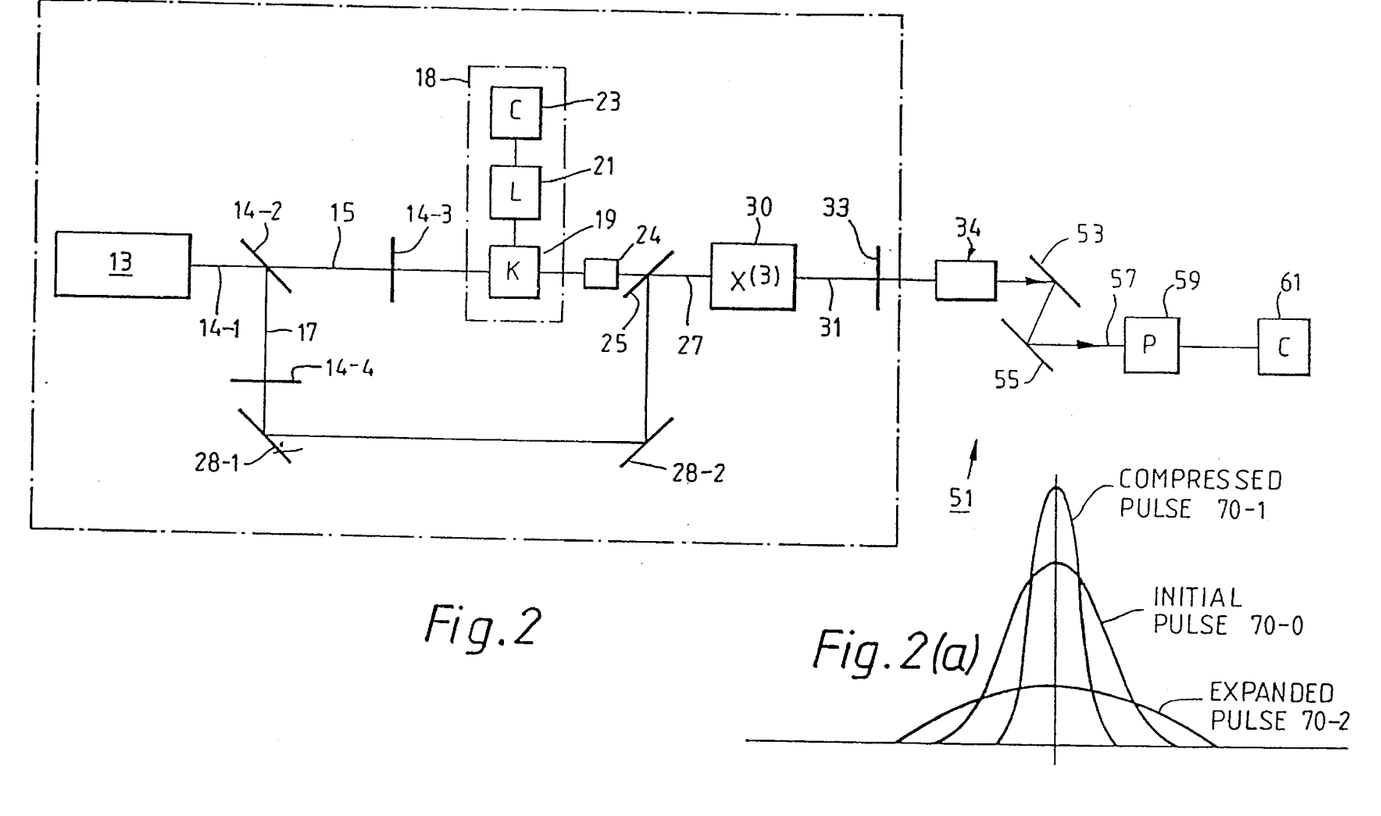
FIG. 2 is a schematic representation of another embodiment of an optical system for transmitting information which is constructed according to the teachings of the present invention.
FIG. 2(a) is a diagram showing the initial (i.e. before passing through the non-linear medium), expanded and compressed probe (i.e. weak) pulses in the FIG. 2 embodiment.

Referring now to FIG. 2, there is shown another embodiment of an optical system for transmitting information constructed according to the teachings of the present invention and represented generally by reference numeral 51.

System 51, which utilizes the temporal effects of cross phase modulation to produce a pulse compression type switch, includes a laser system 13 for generating a beam 14-1 of ultrashort laser light pulses, beam 14-1 including intense pulses of one frequency F1 and weak pulses of another frequency F2, a dichroic beamsplitter 14-2, a pair of filters 14-3 and 14-4, a pair of deflection mirrors 28-1 and 28-2, an adjustable optical delay 24, a beamsplitter 25, modulating means 18, a nonlinear medium 30 and a filter 33, all arranged and functioning as in the FIG. 1 embodiment except that the length of non-linear medium 30 is such that there is effectively no "walk-off".

System 51 also includes a pair of parallel grating plates 53 and 55, which receive fourth beam 31 from filter 33 and produce a fifth beam 57. As will be explained later in greater detail, grating plates 53 and 55 are used to temporally resolve fourth beam 31 by optically delaying the longer wavelengths of light relative to the shorter wavelengths of light. A photodiode 59 or other light sensitive measuring device is disposed along the path of fifth beam 57. Finally, a computer 61 for processing the signals emitted by photodiode 59 is electrically connected to photodiode 59. For reasons to be discussed more fully below, computer 61 is programmed so that it will only process signals having an intensity above a predetermined threshold, the threshold being for example the intensity of weak pulses that pass through non-linear medium 29 without corresponding intense pulses.

Before discussing the operation of system 51, it is important to understand that, while for the sake of simplicity, the weak and intense pulses emitted from laser system 13 have been described as being of two different frequencies, the weak and intense pulses are actually of two different frequency bandwidths, each frequency bandwidth being for example a few tenths of a nanometer wide. Consequently, each pulse includes frequency components from across its entire bandwidth. However, these frequency components, while being spread over the spectral width of the pulse, are nonetheless homogeneously distributed over the entire temporal width of the pulse. In other words, at any point in time, the distribution of frequency components within each pulse is homogeneous.

With the above kept in mind, the description of the operation of system 51 is hereinafter set forth. Laser system 13 is activated, causing the emission therefrom of laser light including intense pulses of one frequency bandwidth within beam 15 and of weak pulses of another frequency bandwidth within beam 17. Instead of a laser system comprising single laser, two lasers could be employed, each emitting a separate beam. Information from computer 23 is then encoded into beam 15 using shutter 19 in the manner described above to eliminate certain intense pulses. Beams 15 and 17 are then combined using mirrors 28-1 and 28-2 and beamsplitter 25 to produce beam 27. Beam 27 now consists of weak pulses and intense pulses, synchronized using adjustable optical delay 24 so that they arrive simultaneously at non-linear material 30.

Beam 27 then travels across non-linear material 30, being transformed in the process by cross-phase modulation into beam 31. Beam 31 includes intense pulses and two varieties of weak pulses, namely, non-modulated weak pulses and modulated weak pulses. The non-modulated weak pulses are those weak pulses that propagated across material 29 without a corresponding, copropagating intense pulse. The non-modulated weak pulses are temporally and spectrally indistinguishable from the weak pulses in beam 27. The modulated weak pulses are those weak pulses that copropagated through material 30 with intense pulses. The modulated weak pulses have a spectrally broader bandwith than the weak pulses in beam 27. Moreover, the modulated weak pulses are not spectrally homogeneous over time. Rather, the longer wavelength components are more concentrated towards the temporal fronts of the pulses and the shorter wavelength components are more concentrated towards the temporal tails of the pulses.

After emerging from non-linear material 30, beam 31 is then passed through filter 33 which filters out the intense pulses. The non-modulated weak pulses and the modulated weak pulses of beam 31 then arrive at grating plates 53 and 55. As discussed earlier, plates 53 and 55 optically delay in time the longer wavelengths of each pulse relative to the shorter wavelengths. This occurs because plate 53 disperses beam 31 into its frequency components (the longer wavelengths being deflected at a greater angle than the shorter wavelengths and, hence, traveling a greater distance to plate 55) while plate 55 receives the components and recombines them to form beam 57. The resultant effect of passing through grating plates 53 and 55 is as follows: For the weak non-modulated pulses, each of which is homogeneous in frequency distribution, passage through the plates results in temporal expansion. This occurs because the longer wavelengths slow down and go to the back of the pulse while the shorter wavelengths speed up and go to the front of the pulse. One consequence of temporal expansion is that the pulse becomes less intense. This occurs because while the temporal width of the pulse has increased, its energy has not. Consequently, the same amount of energy must be spread over a greater period of time.

In contrast, for the weak modulated pulses, each of which has longer wavelengths concentrated at the front of the pulse and shorter wavelength concentrated at the tail of the pulse, passage through the plates results in temporal compression. This occurs because the longer wavelengths at the front of the pulse are slowed down while the shorter wavelengths at the tail of the pulse are accelerated. The consequence of temporal compression is that the pulse becomes more intense. This occurs because while the temporal width of the pulse has decreased, its energy has not. Consequently, the same amount of energy must be spread over a shorter period of time.

Beam 57, including its compressed and expanded pulses, then arrives at photodiode 59. Both compressed signals and expanded signals trigger the emission of an electrical signal from photodiode 59 to computer 61. Because computer 61 is programmed to ignore signals of an intensity less than the modulated weak pulses in beam 27, only the compressed (i.e. modulated) pulses register. Because the compressed pulses are related to the intense pulses sent through shutter 19 which, in turn, correspond to the information to be transmitted, system 51 can so be used to transmit information.

FIG. 2(a) shows the shapes of an initial (i.e. before passing through non-linear medium 29) a compressed pulse and expanded probe pulse, the initial pulse being identified by reference numeral, 70-0, the compressed pulse being identified by reference numeral 70-1 and the expanded pulse by reference numeral 70-2.

In addition to being used as a system for transmitting information, system 51 may be used for intensity modulating pulses. In addition system 51 may be used as a pulse compression device by removing shutter 19, laser source 21, and computer 23 or as an pulse expansion device by removing shutter 19, source 21 and computer 23 and programming computer 61 to detect only expanded pulses.

Those modifications discussed in conjunction with system 11 are also applicable to system 51.

Instead of using a pair of gratings 53 and 55 for temporally resolving the fourth beam 31, a sequence of prisms or any optical component (or components) or material (i.e. optical fibers) which can produce by group-velocity dispersion the relative delay between short and long wavelengths may be employed.

Figure 3:
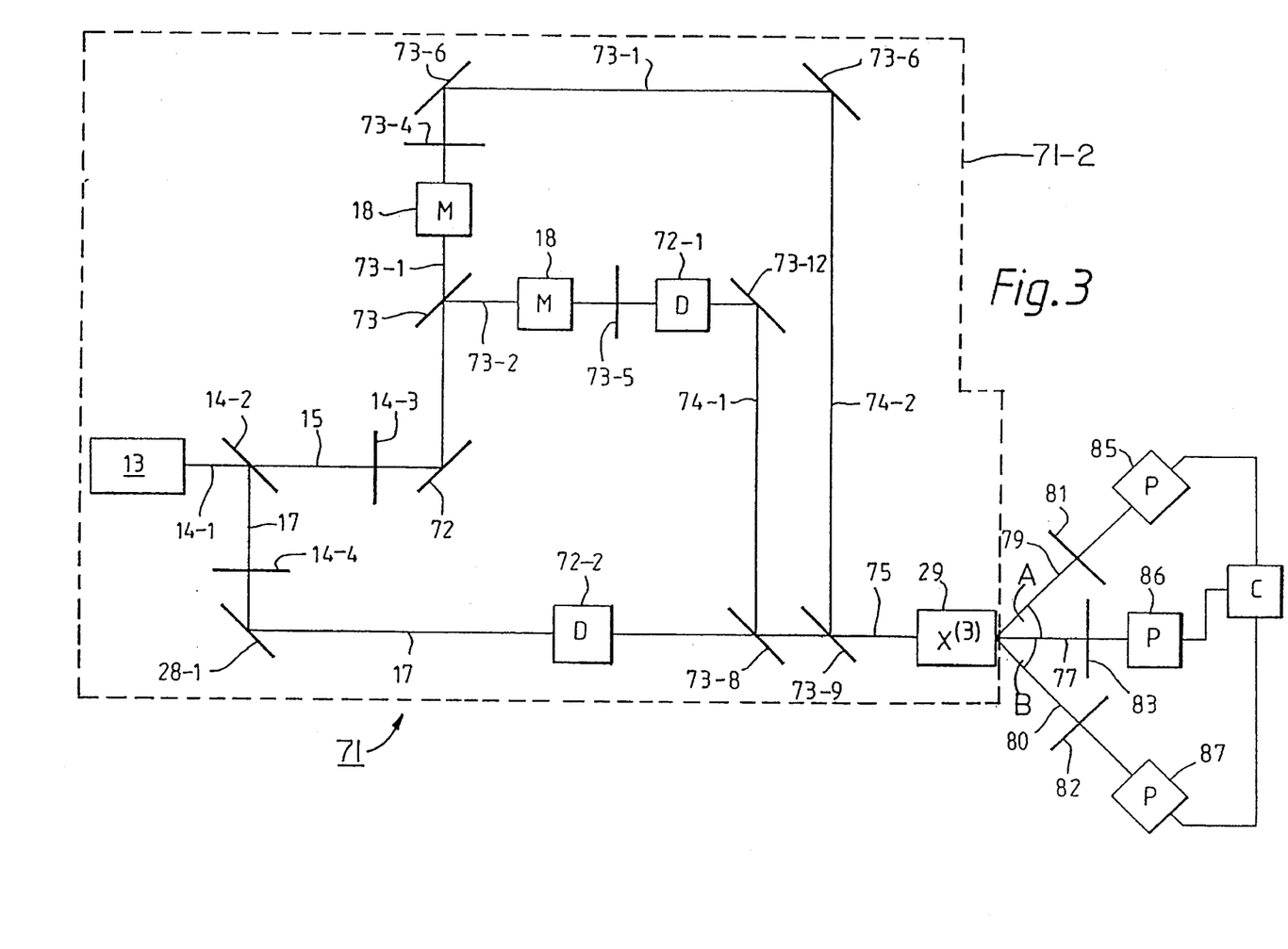
FIG. 3 is a schematic representation of a third embodiment of an optical system for transmitting information which is constructed according to the teachings of the present invention.

Referring now to FIG. 3, there is shown a third embodiment of an optical system for transmitting information constructed according to the teachings of the present invention and represented generally by reference numeral 71.

As will be more fully explained below, system 71 is designed to exploit the principle of induced focusing and utilizes the spatial effects of cross-phase modulation to deflect a beam of light. Self-focusing occurs when a Gaussian shaped beam of intense light travels through a non-linear medium because the intensity of the beam across its cross-section is much greater at its center than around its outer edges. Consequently, the increase in the refractive index of the non-linear medium is also greatest in the center of the beam and weakest around the outer edges. This causes the center of the beam to move slower than the edges which, in turn, causes the edges to bend in towards the center. As a result, the beam narrows in cross-sectional diameter (i.e. focuses). Induced focusing is identical to self-focusing except that the change in the refractive index is applied to a weak beam that is copropagating with the intense beam.

As can be seen, system 71 has many of the same components as systems 11 and 51.

System 71 includes a processor 72. Processor 72 includes a laser system 13 for generating a beam 14-1 of ultrafast laser light, a beamsplitter 14-2 for splitting beam 14-1 into a pair of beams 15 and 17 and a pair of filters 14-3 and 14-4 for filtering beam 15 to contain only intense pulses of at frequency F1 and beam 17 to contain only weak pulses at another frequency F2. System 71 also includes a deflection mirror 72 for deflecting beam 15, a beamsplitter 73 for splitting beam 15 into two beams 73-1 and 73-2, a pair of modulators 18, one for modulating beam 73-1 and the other for modulating beam 73-2, a mask 73-4 disposed along the path of beam 73-1, a mask 73-5, disposed along the path of beam 73-2, a pair of deflection mirrors 73-61 and 73-62, and a pair of beamsplitters 73-8 and 73-9 for combining beams 73-1 and 73-2 with beam 17. Masks 73-4 and 73-5 are designed arranged to mask off different portions of their respective beams. Beamsplitters 73-8 and 73-9 combine the portions of beams 73-1 and 73-2 passed by their respective masks along the beams 15, identified by reference numerals 74-1 and 74-2 to produce a third beam 75.

Processor 72 further includes a non-linear material 29, which is disposed along the path of beam 75 and optical delays 72-1 and 72-2. As will be described later in more detail, non-linear material 29 receives beam 75 and produces a fourth beam 77, a fifth beam 79 and a sixth beam 80, fifth beam 79 and sixth beam 80 being angularly deflected, and by different amounts, relative to fourth beam 77. Filters 81, 82 and 83 are disposed along the path of beams 79 and 80, respectively to filter out the intense pulses present therein.

System 71 further includes photodiodes 85, 86 and 87 which are disposed further along the paths of beams 77, 79, and 80 receive beams 77, 79 and 80 and output corresponding electrical signals to a computer 91 for processing.

System 71 is operated first by activating laser 13, causing the emission therefrom of a beam of laser light having intense (i.e. pump) pulses of one frequency F1 and weak (i.e. probe) pulses of another frequency F2. The intense pulses are split into two beams 73-1 and 73-2 and modulated in accordance with the information from their respective modulators 18 to permit specific intense pulses to pass therethrough. Each beam 73-1 and 73-2 is partially masked by its respective mask 73-4 and 73-5 and then combined at beamsplitter 73-8 and 73-9, respectively with the weak pulses of beam 17 to produce a third beam 75. The intense pulses in beam 73-1 and 73-2 are synchronized with their corresponding weak pulses from beam 17 by using the optical delays so that they will arrive at non-linear material 29 at the proper time with the pulses of beam 17.

The propagation of beam 75 through non-linear material 29 results in the creation of beams 77 and 79 and 80. Beam 77, which was not subjected to induced focusing, consists of the weak pulses of beam 75 that traveled through non-linear material 29 without copropagating with intense pulses. Beam 79, which is angularly deflected by an angle A relative to beam 77 as a result of induced focusing, consists of the copropagating weak and intense pulses, the intense pulses being from beam 73-1. The reason why beam 79 is angularly deflected, rather than being reduced in cross-sectional diameter (the typical result of induced focusing), is that the masking of the intense pulses leads to an asymmetrical change in the refractive index of the non-linear medium. Consequently, this asymmetry causes the intense pulses (and their copropagating weak pulses) to be deflected in the direction of the masked portion of the intense beam.

Beam 80, is angularly deflected by an angle B, which is different from angle A, relative to beam 77. Beam 80 consists of copropagating weak and intense pulses, the intense pulses being from beam 73-2.

Beams 77 and 80 are then passed through filters 81 and 82, which remove the intense light pulses therefrom. The pulses in paths 77, 79 and 80 are converted into electrical signals by photodiodes 85. 87 and 88 and sent to computer 89 for processing.

Figure 4:
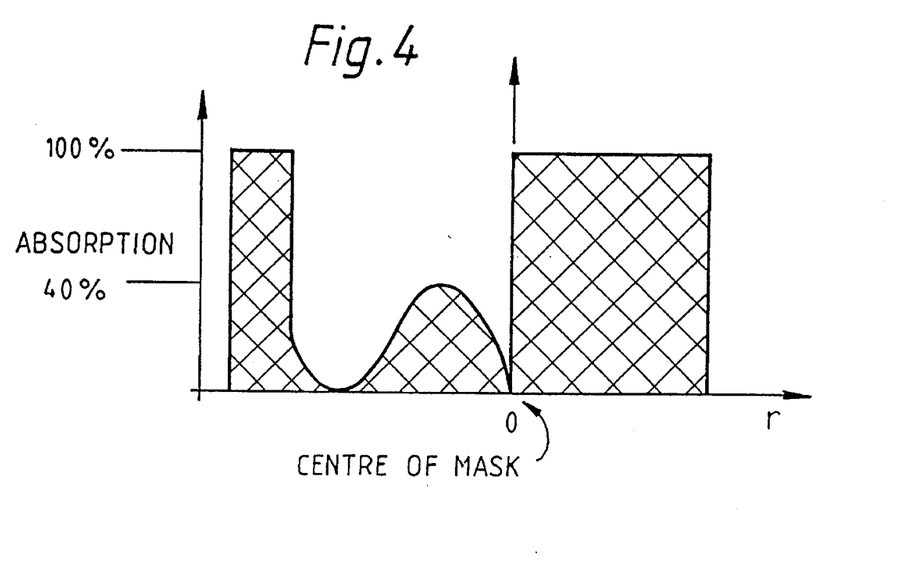
FIG. 4 is a graphic representation of the transmissivity of one of the masks in the FIG. 3 optical system, the transmissiveness of the mask being selected to make the intense beam profile triangular in shape.
Figure 5:
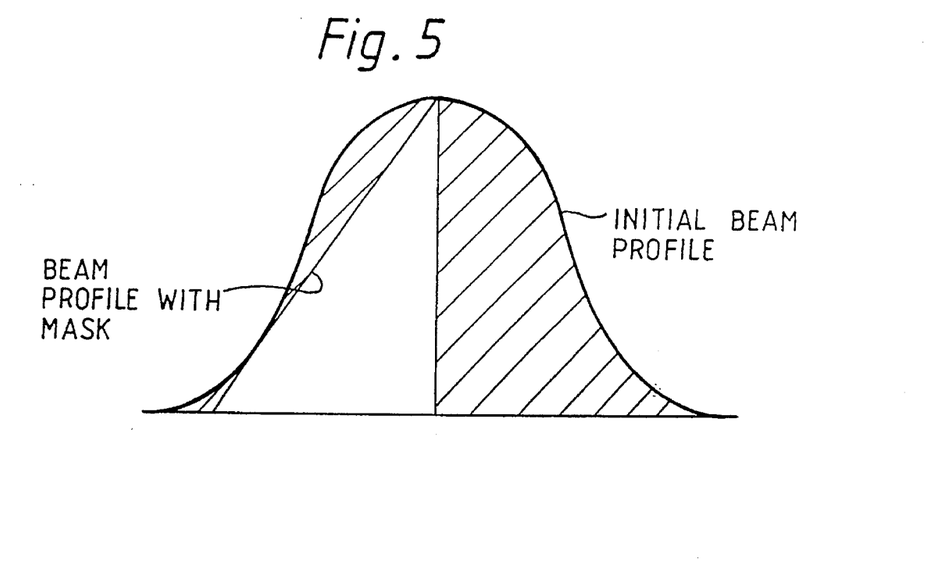
FIG. 5 is an illustration showing how the profile of a pulse can be changed using the mask designed as in FIG. 4

While the above discussion makes it appear that beams 79 and 80 are collimated, the reality is that beams 79 and 80 actually emerge from non-linear medium 29 as diverging cones. However, most of the energy is concentrated in a small angle, the deflection angle. One way to eliminate the energy other than at this small angle is to make the beam profile of the intense beam triangular in shape. This may be done by designing masks 73-4 and 73-5 to mask off a part of the beam such that the intense beam profile becomes triangular. This may be done by varying the transmissivity of masks 73-4 and 73-5 over their cross-sectional area. A graph of transmissivity vs. radius for such a mask 73-4 is shown in FIG. 4. FIG. 5 shows the shape of a pulse without the mask of FIG. 4 and with the mask of FIG. 4; the pulse being gaussian shaped without the mask and triangularly shaped with the mask. Catastrophic self focusing and filament generation can be eliminated if the nonlinear medium is thin enough.

As can be appreciated, in the absence of a pump pulse from either beam 73-1 or beam 73-2, weak beam 17 will pass through non-linear medium 29 and emerge undeflected as beam 77. On the other hand, a pump pulse from beam 73-1 will cause a deflection of the emerging beam to beam path 79 and or pump pulse from beam 73-2 will cause a deflection of the emerging beam to beam path 80.

Also, apparatus 71 can be used, if desired, as a mechanism for altering the spatial distribution of light in a weak beam; i.e. beam 17.

As can be appreciated, the system in FIG. 3 can be easily modified to include more than two pump beams so as to be able to transmit more than two sources of information, or if desired, can be modified so as to have only one pump beam for use in transmitting information from a single source.

The modifications discussed in conjunction with system 11 are applicable to system 71.

Figure 6:
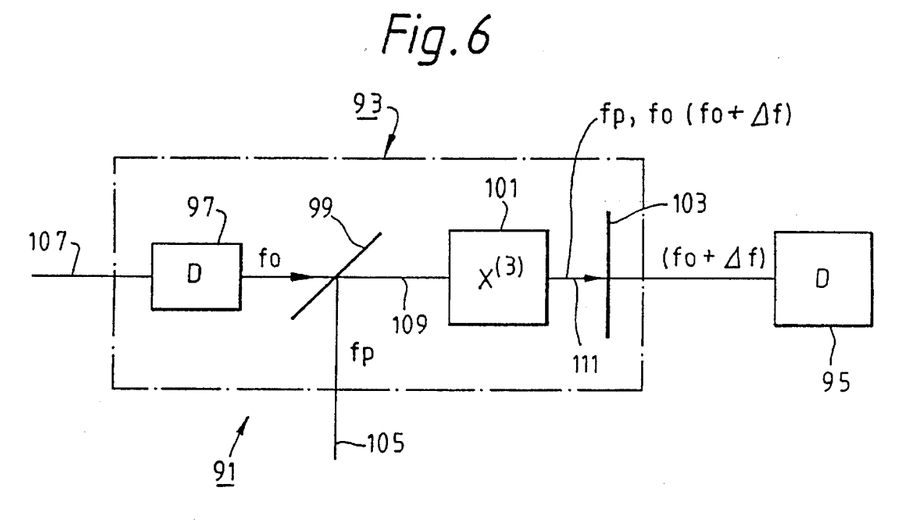
FIG. 6 is a schematic of an optical computing system which includes an AND gate according to the teachings of this invention.

Referring now to FIG. 6 there is shown an optical computing logic device system 91 constructed according to this invention, device 91 including an AND gate 93 which operates using the principle of cross-phase modulation and a detector 95. AND gate 93 includes an adjustable optical delay 97, a beamsplitter 99, non-linear medium 101 and a filter 103.

AND gate 93 is used to perform an AND function on a first beam 105 of intense pulses of one frequency $f_p$ and a second beam 107 of weak pulses of another frequency fo. Delay 97, delays beam 107 as necessary, so that beams 105 and 107 overlap. Beamsplitter 97 combines beams 105 and 107 to form a third beam 109 which is passed through non-linear medium 101. The output from non-linear medium 101 is a fourth beam 111 which may include pulses of frequency fp, pulses of frequency fo and pulses of a frequency (fo+$\Delta$f), the pulses having a frequency (fo+f) resulting from cross-phase modulation and where f is the change in frequency resulting from cross-phase modulation. Filter 103 removes pulses of frequency fp and pulses of frequency fo and allows only pulses of frequency (fo+$\Delta$f) to pass through. The light passed through filter 103, i.e. the pulses having a frequency (fo+$\Delta$f), is detected by detector 95. Detector 95 may be a photodiode.

Figure 7:
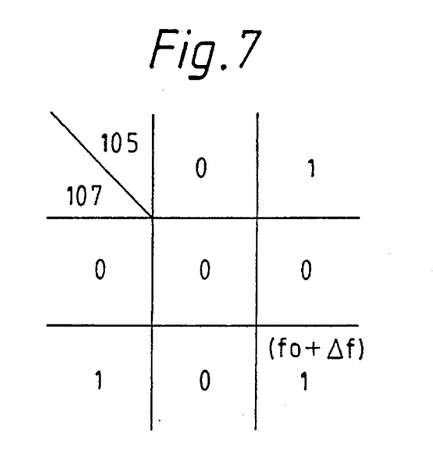
FIG. 7 is a truth table for the AND gate in FIG. 6.

AND gate 93 operates in the following manner. If there is a pulse from beam 105 and there is no pulse in beam 107, there will be no output from filter 103. If there is no pulse in beam 105 and there is a pulse in beam 107 there will be no output from filter 103. If there is a pulse in beam 105 and a pulse in beam 107, then there will be an output from filter 103, namely a pulse having a frequency (fo+$\Delta$f). A truth table for AND gate 93 is shown in FIG. 7.

Figure 8:
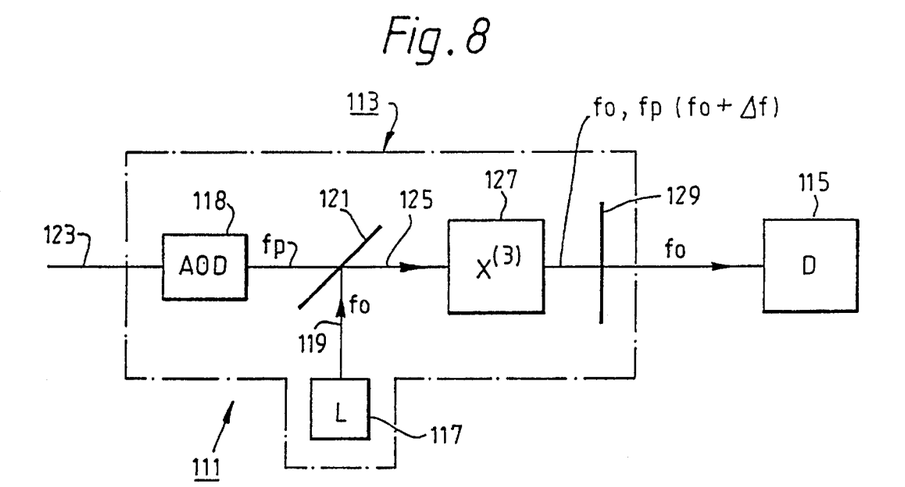
FIG. 8 is a schematic of an optical computing system which includes an INVERTER according to this invention.

Referring now to FIG. 8 there is shown an optical computing logic device 111 constructed according to this invention. Logic device 111 includes an INVERTER 113 which operates on the principle of cross phase modulation and a detector 115. INVERTER 113 includes a laser 117 for generating a weak beam 119 of ultrashort light pulses of frequency fo (i.e. probe pulses), an adjustable optical delay 118 a beamsplitter 121 for combining beam 119 with a signal or input beam 123 which is to be inverted by INVERTER 113 to form a third beam 125, input beam 123 being an intense beam of ultrashort pulses of frequency fp, (i.e. pump pulses), a non-linear medium 127 disposed along the path of beam 125, the light emerging from non-linear medium 127 including pulses of frequency fo, pulses of frequency fp and pulses of frequency (fo+$\Delta$f) where $\Delta$f is the change i.e. shift, in frequency fo as a result of cross-phase modulation and a filter 129 for removing pulses of frequency fp and pulses of frequency (fo+$\Delta$f) and allowing pulses of frequency fo to pass.

Figure 9:
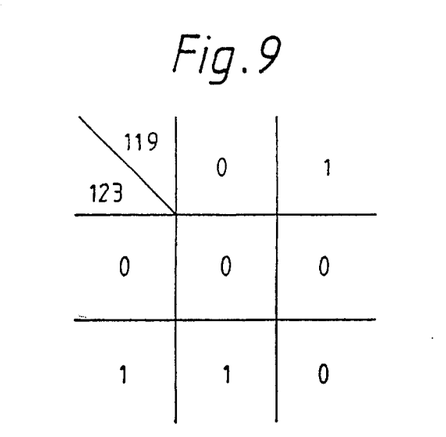
FIG. 9 is a truth table for the INVERTER IN FIG. 8.

INVERTER 113 operates as follows. Laser 117 is continuously outputting pulses fo. If there is a pump pulse fp, there will be no output from filter 129, while if there is no pump pulse fp there will be an output from filter 129, namely, a pulse having a frequency fo. Thus, INVERTER 113 only provides an output in the absence of a pump pulse. A truth table for INVERTER 113 is shown in FIG. 9.

As can be appreciated, other logic elements using XPM can also be formed.

The embodiments of the present invention are intended to be merely exemplary and those skilled in the art shall be able to make numerous variations and modifications to it without departing from the spirit of the present invention. For example, the pump signals (in all embodiments) could be generated by all-optical processors and the output signals could be used in cascade as basic units of all-optical processors. Also, the optical processors may be miniaturized using diode laser technology and integrated optics. Also, instead of different frequencies, the pump and probe signals could have the same frequency but have different polarizations. All such variations and modifications are intended to be within the scope of the present invention as defined in the appended claims.

Figure 10:
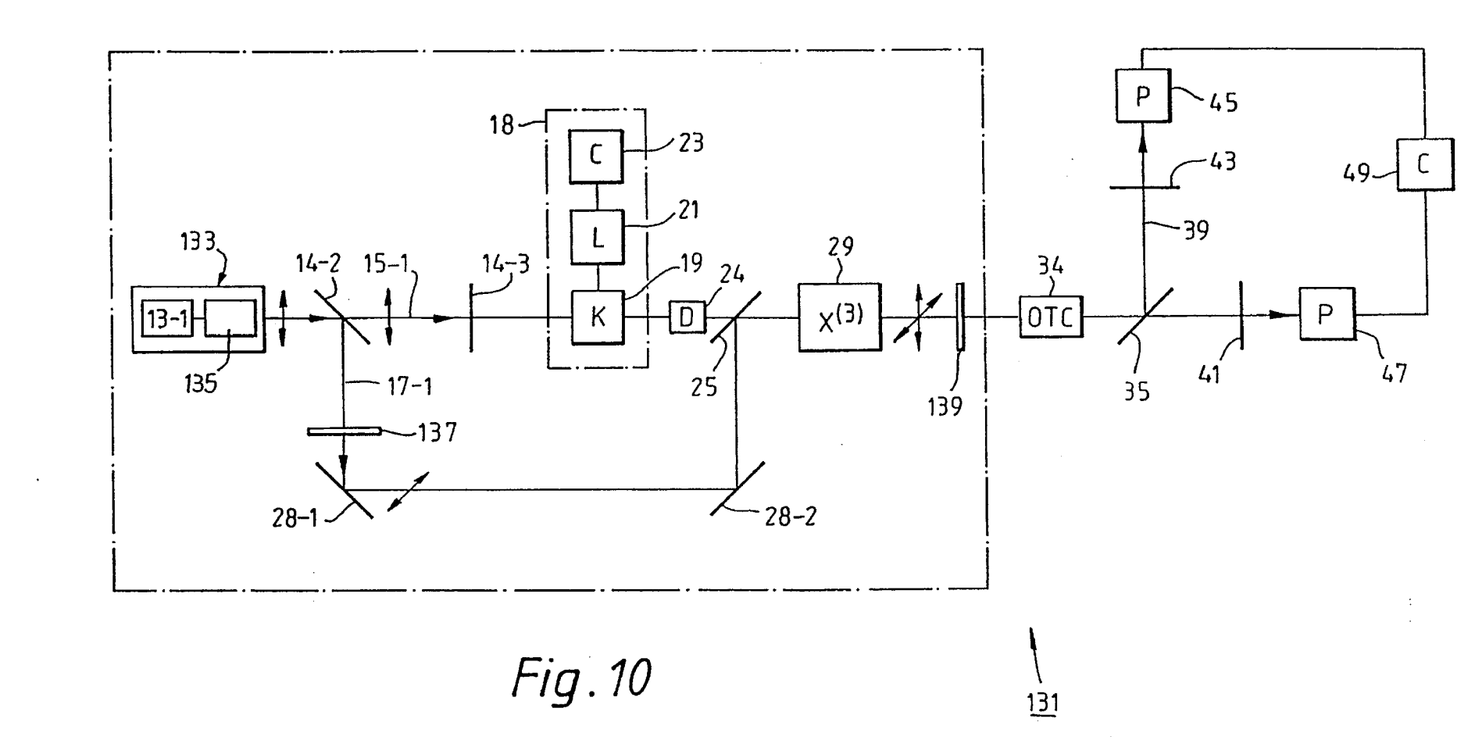
FIG. 10 is a schematic of a modification of the system of FIG. 1.

Referring now to FIG. 10 there is shown a system 131 which is similar to system 11 but wherein the pump and probe pulses have different polarizations rather than different frequencies. System 131 includes a laser system 133 having a laser 13-1 and a polarizer 135. The output beam from laser system 133 is split by beamsplitter 14-2 into an intense beam 15-1 and a weak beam 17-1. A quarter-wave plate 137 changes the polarization of weak beam 17-1 and a polarizer (analyzer) 139 removes intense beam 15-1 from the beam 31-1 emerging from non-linear medium 29.

All embodiments of this invention can be miniaturized using diode technology and integrated optics.

Figure 11:
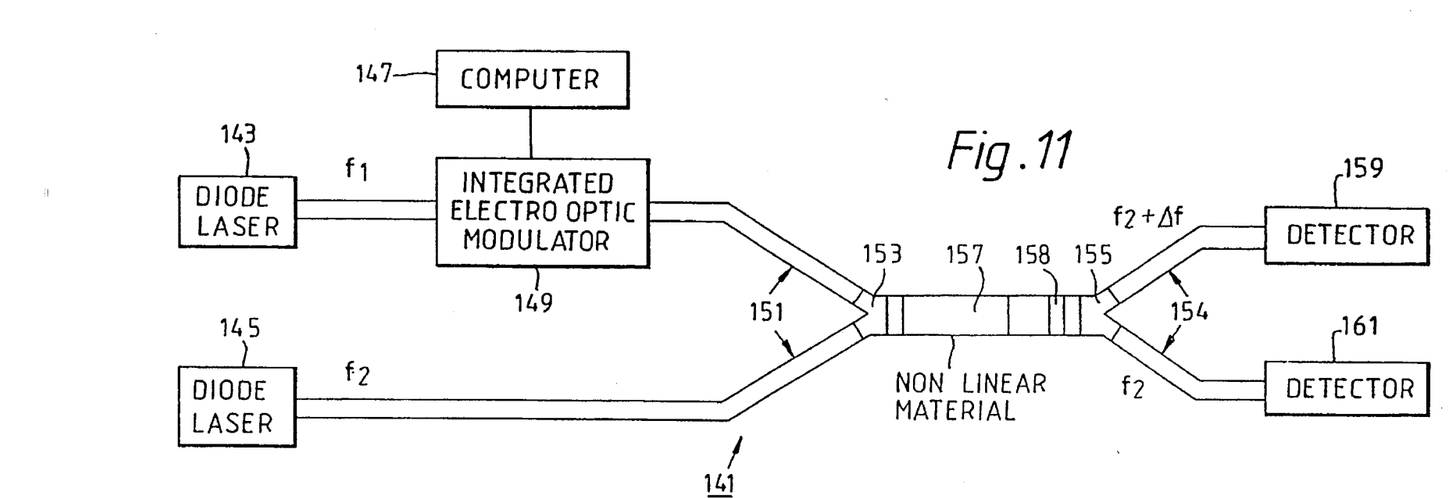
FIG. 11 is a schematic of a miniaturized system according to this invention.

Referring now to FIG. 11 there is shown a system 141 similar to system 11 in FIG. 1 but that has been miniaturized using diode laser technology and integrated optics. System 141 includes a pair of diode lasers 143 and 145, a computer 147 an integrated optics modulator 149, a waveguide 151, a multiplexer 153, a waveguide 154, a demultiplexer 155, a non-linear material 157, a filter 158 and a pair of detectors 159 and 161.

Figure 12A:
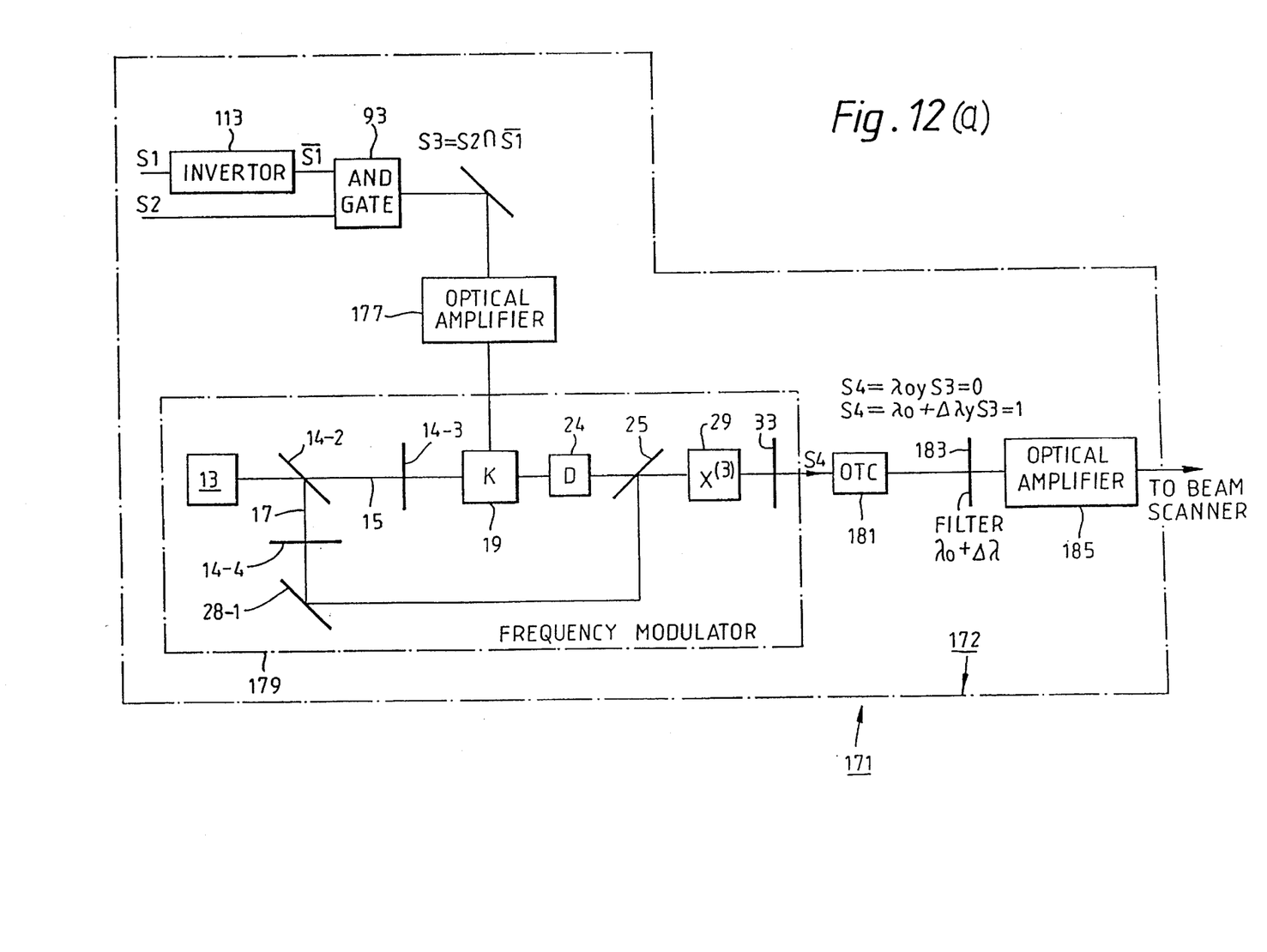
FIG. 12 is a schematic of another embodiment of the invention.
Figure 12B:
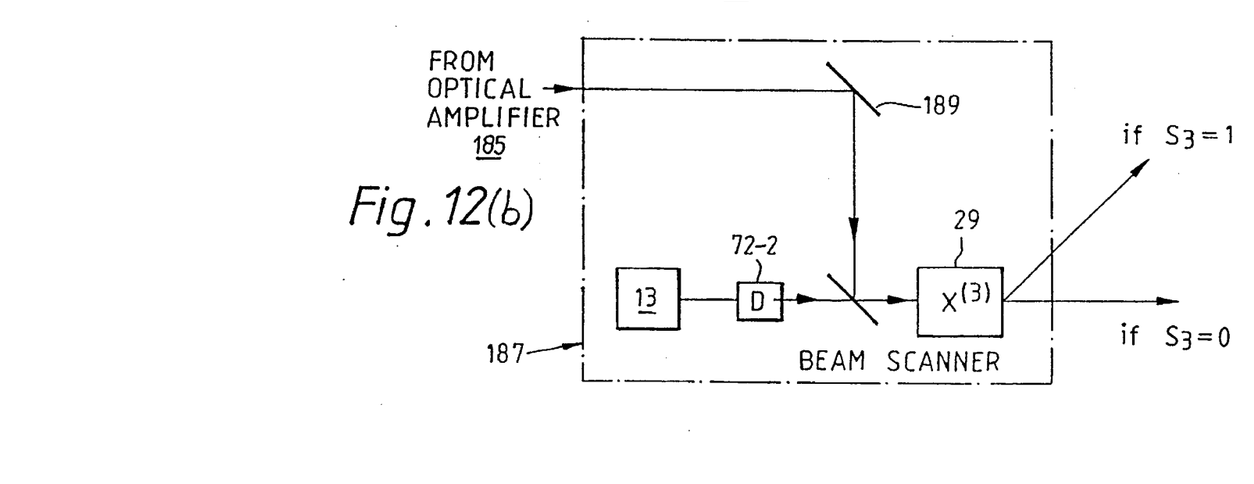

Referring now to FIG. 12 there is shown an example of a system 171 in the form of an all-optical beam scanner remotely driven by an all optical processor 172. System 171 includes an INVERTOR 113 and AND gate 93 an optical amplifier 177, a frequency modulator 179, an OTC 181, a filter 183, an optical amplifier 185 and a beam scanner 187. Beam scanner 187 includes a laser system 13, a delay 72-2, a mirror 189, a beamsplitter 191 and a non-linear medium 29.

What is claimed is:

1. An optical AND gate for performing an AND function on a first beam of light having intense pulses at a first frequency and a second beam of light having weak pulses of light at a second frequency, said optical AND gate comprising:

a) means for combining the two beams to form a third beam;

b) a non-linear medium disposed along the path of the third beam, the light passed through the non-linear medium comprising a fourth beam which includes pulses of the frequency of the first beam, pulses of the frequency of the second beam and pulses of a third frequency, said pulses of the third frequency being pulses of the second frequency which have been frequency modulated by the first beam using cross-phase modulation; and c) filter means for removing pulses of the first frequency and pulses of the second frequency.

* * * * *